United States Patent Office 3,266,437
Patented August 16, 1966

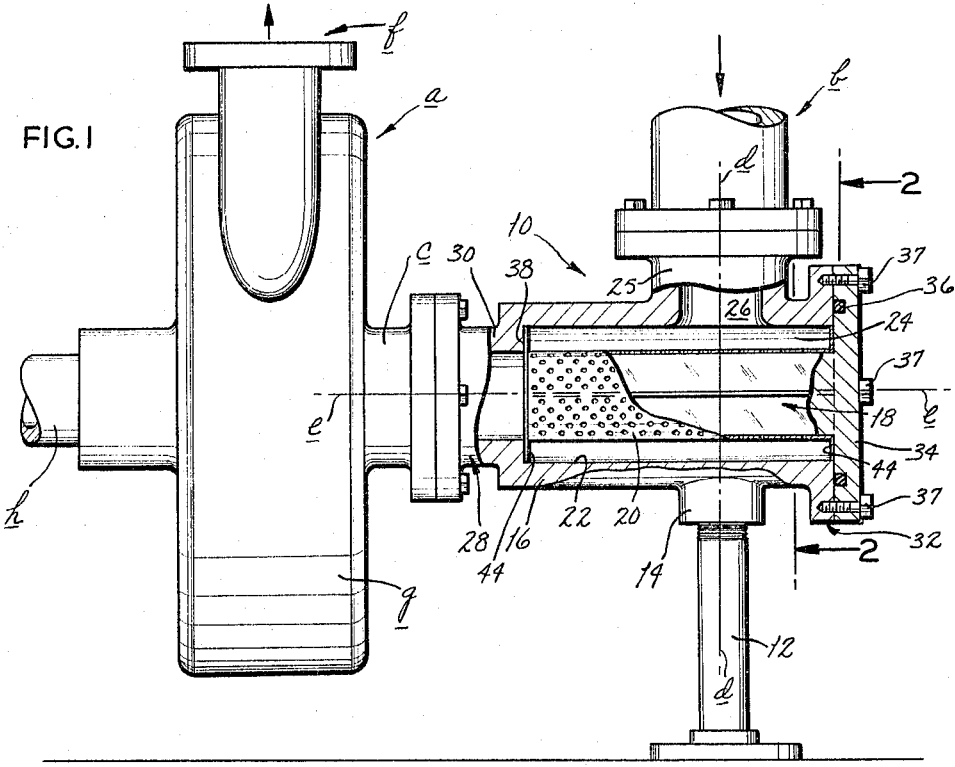
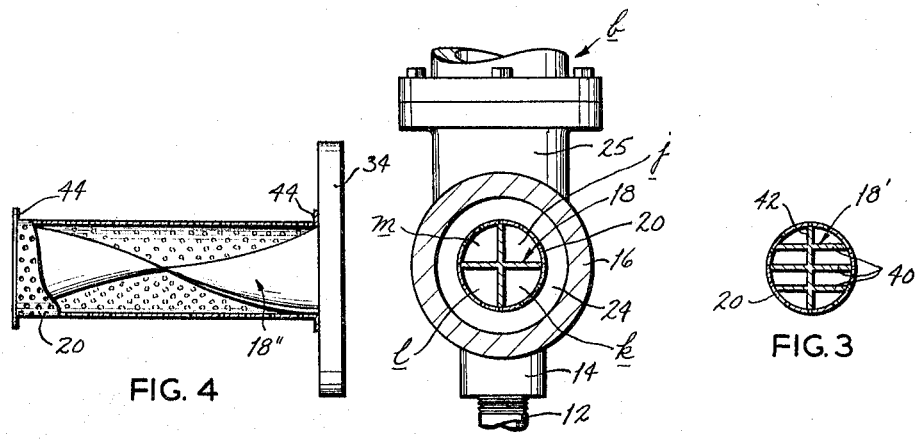

3,266,437
FLOW DIRECTOR AND STRAINER
Joseph J. Blackmore, R.R. 1, Edwardsville, Ill., and
Perry G. Glunt, 91 Wildwood Lane, Kirkwood, Mo.
Filed Jan. 4, 1965, Ser. No. 423,133
8 Claims. (Cl. 103—220)

The present invention relates generally to fluid flow directing apparatus, and more particularly to a combination flow direction and straightener especially suited for conducting a liquid around a 90° angle or bend, thence to a pump, wherein turbulence of such liquid and cavitation at the pump are minimized.

In the field dealing with water supply systems, and the like, it is customary to interpose between the pump and the 90° elbow connected to the fluid supply line, a pipe segment of substantial length extending axially from the inlet of the pump. The purpose of this long segment is to straighten the flow of liquid into the pump and diminish the undesirable excessive turbulence imparted to the liquid at such a bend. Problems of inadequate space and excessive loading on the pump shaft, couplings and bearings have been presented where such long inlet pipes are used.

In fulfilling the need for a compact flow director located in close proximity to the pump, care must be taken to overcome the tendency of the liquid to flow with excess turbulence or with unsymmetrical velocity distribution in the pump inlet pipe, thereby to caues a fluctuating load condition on the pump shaft bearings.

Therefore, among the objects of the present invention are the provisions of a flow director for use in directing a liquid to the inlet of a pump from a supply pipe having an axis substantially perpendicular to such inlet, wherein:

Excessive turbulence in the flow of the liquid and cavitation at the pump are minimized;

The velocity of the liquid is distributed symmetrically about the axis of the inlet to the pump; and Straining is effected in a region of slowed flow to minimize the pressure drop due to such straining.

A further object, applicable when pumps of the centrifugal type are used, is to impart rotational flow to the liquid so that it is introduced into the pump in a direction corresponding to the direction of flow imparted to the liquid by the impeller of such pump.

These purposes are accomplished generally by using a pipe coupled T having a straight section of enlarged diameter, which defines a slowed-flow chamber aligned axially with the inlet to the pump. Provided along this axis within the enlarged chamber is a vane spaced from the chamber inner wall and extending substantially the entire length therealong. A strainer screen encloses the radially outer edges of the vane; it serves to spread the flowing liquid throughout the chamber for even flow to the vane.

Upon entering the chamber, the liquid is slowed in its flow, and it is distributed around the vane by means of the screen. The distributed liquid flowing at the slowed rate, is strained with a minimum pressure drop, and through the strainer it is introduced into the vane, which in turn delivers the liquid from the chamber axially into the pump inlet in a flow whose velocity is symmetrical about the axis of the pump inlet.

These and other objects of the invention and their successful attainment will become apparent to those skilled in the art from the disclosures made in the following descripion of the preferred embodiment of the invention as illustrated in the accompanying drawings, in which:

FIG. 1 is an elevational view, broken away in parts, showing the flow director of the present invention interposed between a pump and its supply pipe;

FIG. 2 is a cross-sectional view taken along the line 2—2 of FIG. 1;

FIG. 3 is a cross-sectional view of an alternative embodiment of the flow director vane illustrated in FIG. 1; and FIG. 4 is an elevational view, partially broken away, of a spiraled flow directing vane enclosed within a flow spreading strainer.

Referring now to the drawings, wherein like reference characters designate like or corresponding parts throughout the several views, there is shown in FIG. 1 a centrifugal pump, generally designated $a$, used to pump liquid delivered to it by a supply pipe $b$. The pump $a$ and supply pipe $b$ are shown as conventionally arranged in circulating water systems; that is, with the axis $d$—$d$ of the supply pipe $b$ perpendicular to the axis $e$—$e$ of the pump "eye" or inlet $c$. The centrifugal pump $a$, whose inlet $c$ has the same diameter as the supply pipe $b$, also includes a tangential outlet $f$, an impeller housing $g$, in which the impeller (not shown) rotates, an impeller drive shaft $h$, and a support pedestal (not shown).

Although a centrifugal pump is illustrated, it should be understood that the present invention is not limited to use with centrifugal pumps. Rather the flow director has unique application where the liquid being pumped is caused to flow through any passage including a 90° bend.

Interposed between the supply pipe $b$ and pump inlet $c$ is the flow director, generally designated 10; it is supported in horizontal alignment with the pump inlet $c$ by means of an adjustable support pedestal 12. The pedestal 12 in turn is provided in vertical registration with the supply pipe axis $d$—$d$ to react the downward force of the pipe and has its upper end threaded into a boss 14 formed integrally of the flow director 10.

Hollow body

The hollow body 16 of the flow director 10 is a cast metal member. It resembles a conventional pipe coupler of modified T configuration and includes a straight horizontally-extending section having an inner cylindrical wall 22 which defines an enlarged chamber 24. A flanged stub branch 25 extends vertically from the straight section near its one end to terminate in a flanged connection at the lower end of the supply pipe $b$. The branch 25 includes a flow inlet 26 which connects the supply pipe $b$ in flow communication with the hollow body chamber 24. The end of the straight section designated 28 serves as the outlet of the flow director 10. It includes a reducer section 30 which communicates with the chamber 24 at an internal shoulder 38 and has an inside diameter which corresponds to that of the pump inlet $c$. The outlet end 28, of the hollow body straight section, is flanged so that it may be bolted to the body inlet flange. It should be noted that the flow inlet 26, reducer section 30, and the pump inlet $c$ all provide passageways of the same diameter, while the passageway formed by the inner wall 22 has a substantially greater diameter.

The end of the straight section opposite outlet end 28 is a clean-out end 32. It is located in closer proximity to the flow inlet 26 than is the outlet end 28. The clean-out end 32 is flanged so that by means of bolts 37 and an end cap 34, may be closed during normal operation and opened for inspection or maintenance.

Removable end cap and vane assembly

The removable end cap 34 is preferably a cast metal plate having a partially recessed sealing gasket 36 provided on its inner side. By tightening bolts 37, leakage between the clean-out end 32 of the straight section and end cap 34 is prevented.

The flow-directing vane 18 is preferably either cast integral with the removable end cap 34 or welded to it so that these elements may be removed from and secured to the hollow body 16 as one piece. The flow-directing vane 18 extends from the inner side of the end cap 34 along the axis e—e of the chamber 24. Because the flow inlet 26 is located closer to the clean-out end 32 of the hollow body 16 than it is to the outlet end 28, the major portion of the vane length is included between the flow inlet 26 and the outlet end 28 of the hollow body 16. As may be seen in FIG. 1 the distant end of vane 18 abuts against the internal shoulder 38 at the mouth of the reducer section 30. Throughout its length the vane 18 is spaced from the inner wall 22 of the hollow body 16 so that the flow of liquid into the chamber 24 may be distributed about the vane 18.

As shown in FIGS. 1 and 2 the flow directing vane 18 has a cruciform cross-section. This vane arrangement partitions or divides the liquid delivered to the mouth of the reducer section 30 into quadrants *j, k, l,* and *m*. In FIG. 3 the flow-directing vane 18' is shown as being comprised of three stacked trays 40 which extend horizontally outward to both sides of a central vertical plate 42. The vane arrangement of FIG. 3 divides the liquid passageway into eight separate sections.

In FIG. 4 the flow-directing vane 18'' integral with the removable end cap 34 takes the form of a spirally-drawn flat bar. Like the cruciform vane of FIGS. 1 and 2, the spiral vane 18 is spaced from the straight section inner wall 22, when inserted within the chamber 24 of hollow body 16. It extends axially through the chamber 24 and is especially suited for use with a centrifugal pump because liquid may be introduced into the eye of the pump in the direction of impeller rotation. That is, the direction of the spiral may be chosen such that the momentum of the liquid supplied to the pump *a* aids rather than retards the rotation of the impeller.

*Flow spreader*

The flow spreader 20 of the flow director 10 consists of a cylindrical perforated screen-like tube which surrounds the flow-directing vane 18. The flow spreader 20 is supported by the radially outer edges of the vane 18 and extends the entire length of the chamber 24; its surface area being substantially greater than the area of the inlet or outlet of the chamber. At its ends the flow spreader 20 is provided with retaining rings 44 which abut against the internal shoulder 38 and the inner side of end cap 34. The liquid flowing into chamber 24 is spread over the surface of screen 20 and distributed into the several divided sections former by the flow-directing vane 18. The flow spreading screen 20 also serves as a strainer; the straining taking place in a region of slowed flow, thus reducing the pressure drop normally accompanying straining.

*Operation*

Water or other liquid delivered through the supply pipe *b* enters the enlarged chamber 24 through the flow inlet 26. The velocity of the entering liquid is reduced as it flows into the chamber 24. The flow spreading screen 20 distributes the liquid substantially uniformly around its outer surface and delivers it by means of its perforations into the divided passageway sections. The liquid in the partitioned passageway sections is directed axially through the chamber 24 and exists from the flow director 10 through the reducer section 30. In this manner the excessive turbulent flow normally encountered when a liquid is fed around a 90° bend is suppressed. Because the velocity of the liquid has been symmetrically distributed about the axis of the inlet pipe by the flow spreader 20, it is introduced into the eye of the pump without unevenly loading the impeller shaft *h*.

Where the spiral vane 18'' of FIG. 4 is employed, the liquid is introduced to the pump in the direction in which the impeller is rotating.

Obviously, many modifications and variations of the present invention are possible in the light of the above teachings. For example, the vane and the flow spreader could be conical, rather than cylindrical, with the apex located at the clean-out end of the flow director. Also, the reduced section could be formed to provide a gradually decreasing diameter from the chamber to the pump inlet. It is therefore to be understood that, within the scope of the appended claims, the invention may be practiced otherwise than as specifically described.

We claim:

1. For use in directing liquid to the inlet of a pump from a supply pipe having an axis substantially perpendicular to such inlet, a flow director comprising
   chamber means having a chamber inlet connectable to such supply pipe, a chamber outlet connectable to such pump inlet, and a hollow interior portion having a greater diameter than that of either said pump inlet or supply pipe,
   vane means positioned within said chamber means along the extended axis of the chamber outlet for delivering the liquid from said hollow interior portion of said chamber means to such chamber outlet, thereby to suppress excessive turbulence in such flow and cavitation at such pump, and
   flow-spreader means spaced inwardly of said inner wall of said chamber means and surrounding said vane means, said flow-spreader means being interposed between said chamber inlet and chamber outlet, and extending substantially the length of said chamber means, whereby to distribute the liquid substantially uniformly to said vane means.

2. For use in straining and directing a liquid to the inlet of a pump from a supply pipe having an axis substantially perpendicular to such inlet, the flow director as defined in claim 1, wherein
   said flow-spreader means is a strainer screen having an area substantially greater than the area of said chamber outlet,
   whereby the straining occurs in a region of slowed flow over the screen area and the pressure drop due to straining is thereby minimized.

3. For use in directing liquid to the inlet of a centrifugal pump from a supply pipe having an axis substantially perpendicular to such inlet, the flow director as defined in claim 1, wherein
   said vane means is spiraled, whereby to impart curving rotational flow to the liquid delivered to the centrifugal pump.

4. For use in directing liquid to the inlet of a pump from a supply pipe having an axis substantially perpendicular to such inlet, a flow director comprising
   a hollow body of T configuration and including a straight section, whose inner wall defines a chamber, and a branch entering the chamber at an angle of 90° to said straight section, the branch serving as the flow inlet to said chamber, one of the ends of the straight section serving as the flow outlet and the other end having a removable cap,
   the straight section of the body having an inner diameter greater than that of the inlet of such pump,
   further comprising a reducer section in flow-conducting relationship between said flow outlet end of the body and the inlet of such pump,
   a vane element extending axially and spacedly within the inner diameter of said straight section from said removable cap to a point adjacent to said reducer section, and
   a perforated tubular element supported spacedly within the inner diameter of and extending from said removable cap to the outlet end of said straight section, said tubular element enclosing the radially outer edges of said vane element.

5. The flow director as defined in claim 4, wherein said vane element comprises
   a spirally-drawn flat bar extending axially and spacedly within the inner diameter of said straight section of said body, the end of said bar adjacent to said outlet end of said straight section being spiraled in a direction corresponding to the direction of fluid flow imparted by such pump.

6. The flow director as defined in claim 4, wherein said vane element has a cruciform cross-section.

7. The flow director as defined in claim 4, wherein said perforated tubular element is a cylindrical strainer.

8. The flow director as defined in claim 4, wherein said perforated tubular element is a screen whose vane-enclosing portion adjacent to the outlet end of the hollow body is circular in cross-section and has a diameter greater than that of the inlet of such pump.

References Cited by the Examiner

UNITED STATES PATENTS

| | | | |
|---|---|---|---|
| 2,030,041 | 2/1936 | Allen | 103—220 |
| 2,195,886 | 4/1940 | Hawley | 103—220 X |

FOREIGN PATENTS 121,552    4/1948   Sweden.

ROBERT M. WALKER, *Primary Examiner.*